United States Patent [19]

Monrolin

[11] 4,100,499
[45] Jul. 11, 1978

[54] CARRIER SYNCHRONIZATION SYSTEM FOR COHERENT PHASE DEMODULATORS

[75] Inventor: Jean Louis Monrolin, LaGaude, France

[73] Assignee: International Business Machines Corporation, Armonk, N.Y.

[21] Appl. No.: 841,257

[22] Filed: Oct. 12, 1977

[30] Foreign Application Priority Data

Oct. 18, 1976 [FR] France .............................. 76 32450

[51] Int. Cl.² .......................................... H04L 27/22
[52] U.S. Cl. .................................... 329/50; 325/320; 325/346; 329/124
[58] Field of Search ................. 329/50, 122, 124, 125; 325/320, 346, 419, 423

[56] References Cited

U.S. PATENT DOCUMENTS

| | | | |
|---|---|---|---|
| 3,806,815 | 4/1974 | Fletcher et al. | 329/122 X |
| 3,878,468 | 4/1975 | Falconer et al. | 325/320 |

OTHER PUBLICATIONS

Baker et al., Satellite Communication Systems Technology, London, Apr. 7–10, 1975, pp. 201–206.
Proceedings of the Second International Conference on Digital Satellite Communications, Paris, Nov. 1972, papers D2 to D6.

Primary Examiner—Siegfried H. Grimm
Attorney, Agent, or Firm—John B. Frisone

[57] ABSTRACT

This invention concerns a carrier synchronization system for a four-phase coherent PSK demodulator. The four-phase PSK signal is demodulated by an in-phase reference carrier and a quadrature reference carrier both of which are locally generated by a reference carrier source. The in-phase and quadrature components of the four-phase PSK signal that result from these demodulation operations are delayed a time interval substantially equal to T/2 seconds, T being the signaling period. The product of the delayed in-phase component and the sign of the quadrature component is compared with the product of the delayed quadrature component and the sign of the in-phase component, to produce a phase error signal. This error signal is used to control the adjustment of the reference carrier source.

2 Claims, 9 Drawing Figures

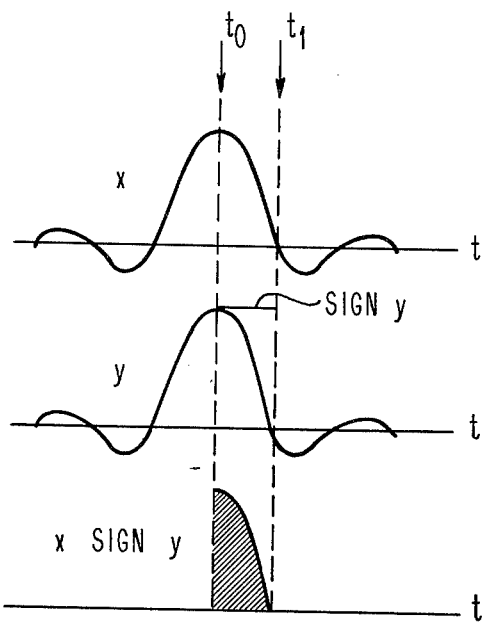
FIG. 4a
FIG. 4b
FIG. 4c
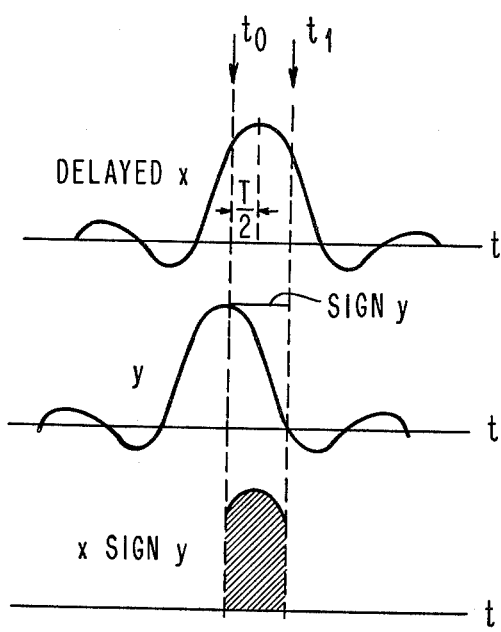
FIG. 4d
FIG. 4e
FIG. 4f

CARRIER SYNCHRONIZATION SYSTEM FOR COHERENT PHASE DEMODULATORS

FIELD OF THE INVENTION

This invention relates to phase demodulators and, more particularly, to a carrier synchronization system for coherent phase demodulators that is particularly suitable for time-division multiple-access satellite communication systems.

BACKGROUND

In a multiple-access satellite system, a satellite carrying a single repeater provides multiple simultaneous transmission links between several Earth stations. A time-division multiple-access (TDMA) communication system is a multiple-access system wherein the time available is divided up into frames comprising a number of time slots one of which is allocated to each station for the purpose of transmitting a burst of data to another station. A typical Earth station includes a data terminal, a modem, and RF transmitting and receiving equipment. The modem must permit achieving the most efficient use of the passband of the repeater carried by the satellite, and the modulation technique generally used is the so-called phase-shift keying (PSK) modulation in conjunction with a coherent demodulation.

The PSK modulation technique is widely used and a detailed description thereof may be found, for example, in the book entitled "Data Transmission," by R. W. Bennett and J. R. Davey, Chapter 10, McGraw-Hill, New York, 1965, and in "Principles of Data Communication," by R. W. Lucky, J. Salz and E. J. Weldon, Jr., Chapter 3, McGraw-Hill, New York, 1968. Briefly, the PSK modulation technique requires that the sequence of bits to be transmitted be first converted into a sequence of symbols or pairs of symbols, wherein each symbol can take on a discrete number of values. These symbols or pairs of symbols are then transmitted one at a time, at instants which have a T-second spacing and are called signaling instants, in the form of a carrier phase change relative to the phase of the immediately preceding symbol. The coherent demodulation of a PSK signal is also a commonly used technique, a detailed description of which is provided, for example, in the two books referred to above. Briefly, the coherent demodulation technique involves measuring the phase of the receiving signal by means of a comparison with the phase of a local reference carrier. Obviously, a correct demodulation of the PSK signal requires that the reference carrier at the demodulator be synchronized with the transmitted carrier; it is therefore essential that some carrier synchronization means be provided in a coherent PSK demodulator.

When used in a TDMA communication system, a coherent PSK demodulator must include a carrier synchronization system that is very efficient in the presence of noise and very fast. The reasons for the latter requirement are that such a synchronization is necessary for each individual burst of data, taking into account the lack of carrier phase coherence between adjacent bursts, and that both the guard time interval between two adjacent bursts and the length of the carrier synchronization preamble at the beginning of each burst must be minimized to provide an efficient transmission. The reduction of the noise effects that is made possible by the carrier synchronization system is related to the fact that it is not feasible to provide RF modems intended to be used in TDMA systems with sophisticated noise-reducing systems similar to those used in modems designed for telephone channels.

There are two main types of carrier synchronization systems, namely, the phase-locked-loop systems and the passive-filter systems. The phase-locked-loop systems are discussed in many books and articles, and reference may be made, for example, to an article entitled, "Carrier Synchronization and Detection of Polyphase Signals," by W. C. Lindsey and M. K. Simon, published in IEEE Transactions on Communications, June 1972, pages 441–454, and to an article entitled, "Carrier Synchronization and Detection of QASK Signal Sets," by M. K. Simon and J. G. Smith, in IEEE Transactions on Communications, Vol. COM-22, No. 2, February 1974, pages 98–106. Systems such as those described in these articles are very effective as far as reducing the effects of noise is concerned, but do not permit achieving a very fast synchronization. Accordingly, preference was given to the use of passive filter systems of the type described, for example, in articles D2 to D6 of the Proceedings of the "Colloque International sur les Telecommunications Numeriques par Satellite," (International Conference on Digital Satellite Communications), Paris, Nov. 28–30, 1972. However, to increase the effectiveness of the passive-filter systems, it proved necessary to use the so-called quenching mode described, for example, in an article entitled, "A Fast Acquisition Coherent PSK Demodulator Incorporating Passive Narrowband Filters Operable in a Quenching Mode," by D. W. Baker and R. F. Robinson, in Satellite Communication Systems Technology, London, April 1975, pages 201–206 (an IEE publication), thereby increasing the complexity of such systems. It was found more practical, therefore, to concentrate on the phase-locked-loop systems and carry out additional development work to improve their performance characteristics.

OBJECTS OF THE INVENTION

Accordingly, it is an object of the present invention to provide a phase-locked-loop carrier synchronization system for use in coherent PSK demodulators which is very effective in the presence of noise and very fast.

Another object of the present invention is to provide such a system which can readily be implemented using simple components. These and other objects are generally achieved through the use of a carrier synchronization system for a four-phase coherent PSK demodulator in which the four-phase PSK signal is demodulated by an in-phase reference carrier and a quadrature reference carrier, both of which are locally generated by an adjustable reference carrier source. The in-phase and quadrature components of the four-phase PSK signal that result from these demodulation operations are delayed a time interval substantially equal to T/2 seconds, T being the signaling period. The product of the delayed in-phase component and the sign of the quadrature component is compared with the product of the delayed quadrature component and the sign of the in-phase component to produce a phase error signal. This error signal is used to control the adjustment of the reference carrier source.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 4a–4f represent waveforms helpful in gaining a better understanding of the invention.

Figure 1:
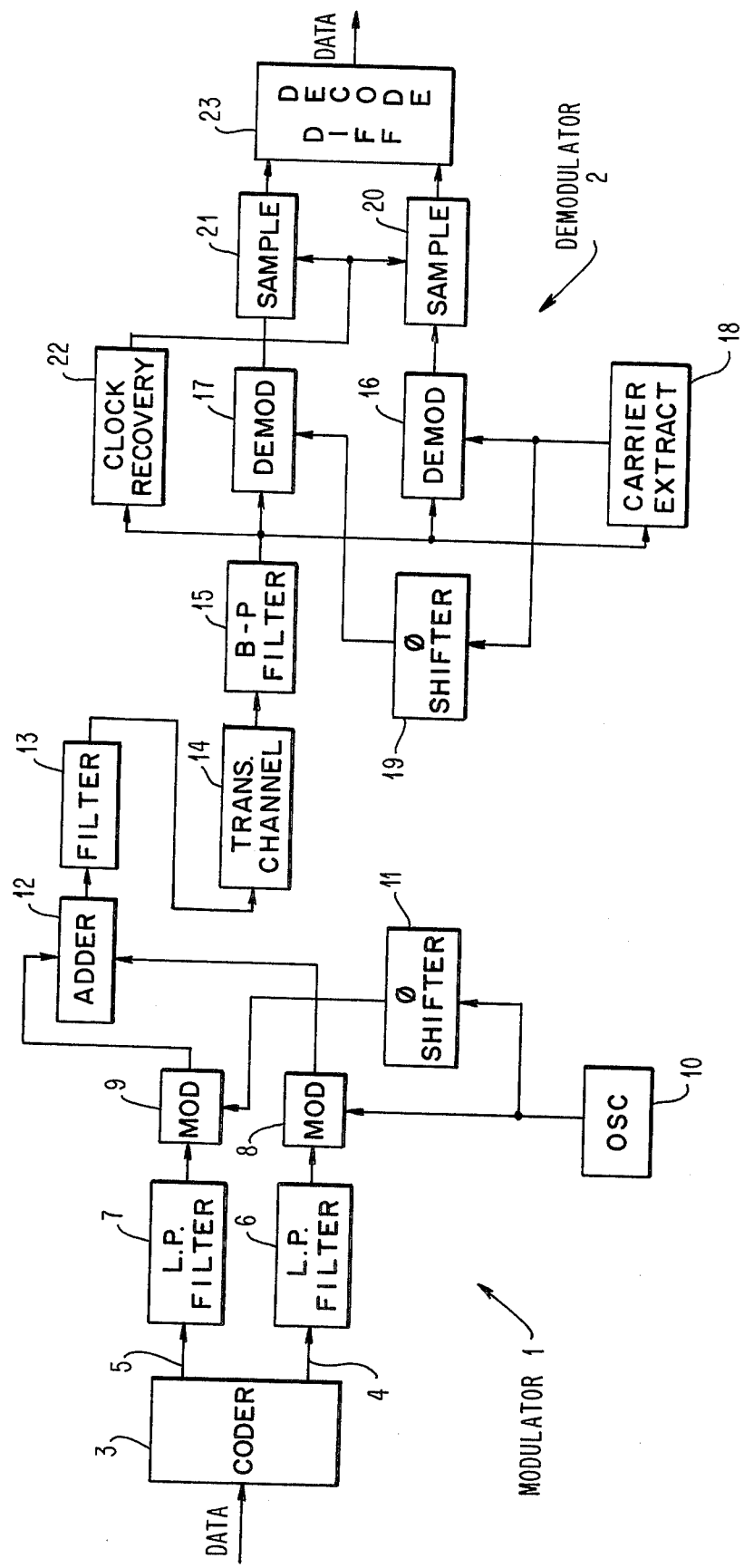
FIG. 1 is a block diagram of a conventional modem using a PSK modulation technique in conjunction with a coherent PSK demodulation technique.

For clarity, a simplified block diagram of a conventional modem using a PSK modulation technique has been shown in FIG. 1. This modem is essentially comprised of a PSK modulator 1 and a PSK demodulator 2. PSK modulator 1 and PSK demodulator 2 rely upon the most widely used technique which consists in defining the phase of the transmitted and received signals by means of their in-phase and quadrature components in a rectangular coordinates system, as described in the previously mentioned book by Bennett and Davey. The data bits to be transmitted are first combined in groups and each group is converted into a pair of symbols in coder 3. The pairs of symbols are successively supplied by the coder 3 at signaling instants spaced T seconds apart, T being the signaling period. A pair of symbols represents the in-phase and quadrature components of the phase to be transmitted at a given signaling instant. The in-phase and quadrature components are respectively available at outputs 4 and 5 of coder 3. Each of these components takes the form of a pulse, the amplitude of which is a function of the value of the component. The pulses corresponding to the in-phase and quadrature components are fed to low-pass filters 6 and 7 which convert them respectively into two signals called baseband signal elements, the form of which is more suitable for transmission. The signal elements thus obtained are used to respectively modulate an "in-phase" carrier and a "quadrature" carrier by means of modulators 8 and 9. The in-phase carrier is directly supplied by an oscillator 10 whereas the quadrature carrier is obtained by using a 90° phase shifter 11 to introduce a phase change of 90° in the in-phase carrier provided by oscillator 10. The modulated signals are then combined in adder 12 and applied to the input of transmission channel 14 through a filter 13. In PSK demodulator 2, the signal received from transmission channel 14 is passed through a bandpass filter 15 and demodulated by means of an in-phase reference carrier and a quadrature reference carrier using demodulators 16 and 17, respectively. The in-phase reference carrier is extracted from the received signal by a carrier extraction device 18 and directly fed to demodulator 16. The in-phase reference carrier, the phase of which is shifted 90° by a 90° phase shifter 19, becomes the quadrature reference carrier fed to demodulator 17. The in-phase and quadrature components respectively obtained at the output of demodulators 16 and 17 take the form of baseband signal elements which, in the ideal case, would be identical to the baseband signal elements available at the output of filters 6 and 7 of PSK modulator 1. The output signals provided by demodulators 16 and 17 are respectively sampled by samplers 20 and 21 at the signaling instants. The signaling instants are extracted from the received signal by means of a clock recovery device 22. The samples provided by samplers 20 and 21 which, in the ideal case, would take the form of pulses identical to those respectively available at outputs 4 and 5 of coder 3 of PSK modulator 1, are applied to the input of a differential decoder 23. The latter is a logic circuit which is the reciprocal of coder 3 and supplies the received data bits. For clarity, the carrier synchronization system designed to cause the in-phase and quadrature reference carriers to remain synchronized with the received signal has not been shown in FIG. 1.

Figure 2:
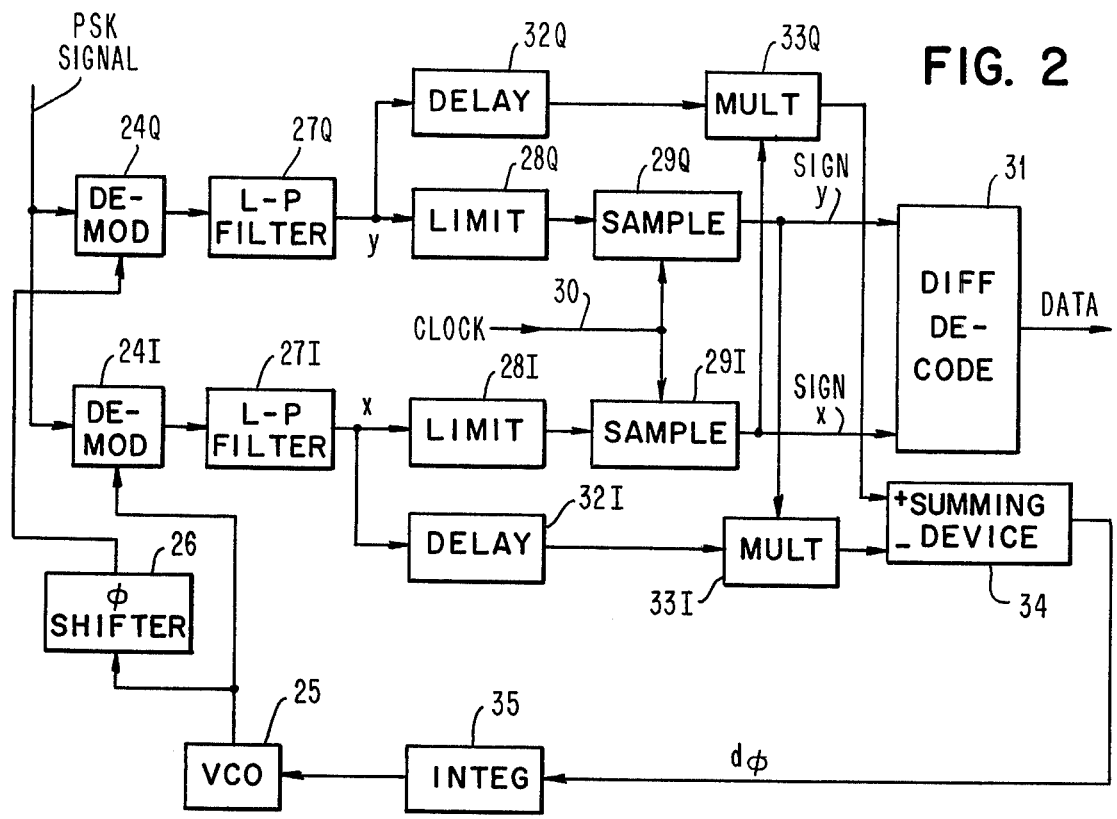
FIG. 2 is a block diagram of a coherent PSK demodulator incorporating the carrier synchronization system of the present invention.

The carrier synchronization system of the present invention will now be described with reference to FIG. 2, which illustrates by way of example a 4-phase PSK demodulator that is operable in conjunction with satellite transmissions and incorporates said system. The received 4-phase PSK signal is fed in parallel to a couple of demodulators 24I and 24Q which, in this example, are balanced ring demodulators. Such demodulators are well known analog components which are widely used in the field of data transmission and will not be described in detail hereafter. A voltage controlled oscillator (VCO) 25 supplies a reference carrier that is fed to demodulator 24I directly and, through a 90° phase shifter 26, to demodulator 24Q. The outputs of demodulators 24I and 24Q are respectively connected to the inputs of two low-pass filters 27I and 27Q. These filters are analog passive filters of a known type that serve to remove undesirable modulation products and thermal noise. The outputs of filters 27I and 27Q are respectively connected to the inputs of two limiters 28I and 28Q supplying, for example, an up level or a down level in response to a positive signal or to a negative signal, respectively. The outputs of limiters 28I and 28Q are respectively connected to the inputs of two samplers 29I and 29Q that are controlled by clock signals sent over line 30 to define the signaling instants. In the example shown, the samplers are conventional type D flip-flops. The clock signals are extracted from the 4-phase PSK signal by a clock recovery device (not shown) of the type described, for example, in articles D2–D6 of the aforementioned Proceedings of the International Conference on Digital Satellite Communications. The outputs of samplers 29I and 29Q are fed to a differential decoder 31 which supplies the received data. Conventionally, decoder 31 is a logic circuit that is the reciprocal of the one used in the PSK modulator of the modem. In the example shown, this decoder is a well known, widely used differential decoder which is in accordance with CCITT Recommendation V26. The outputs of filters 27I and 27Q are also connected to the inputs of a couple of delay means 32I and 32Q, respectively, each of which introduces a delay of T/2 sec., T being the signaling period. In this example, said delay means consist of delay lines using coaxial cables. The outputs of delay means 32I and 32Q are respectively connected to a first input of two analog multipliers 33I and 33Q, the second inputs of which are respectively connected to the outputs of samplers 29Q and 29I. In this example, multipliers 33I and 33Q are comprised of balanced ring modulators. The outputs of multipliers 33I and 33Q are respectively connected to the (−) and (+) inputs of an analog summing device 34. The output of device 34 is connected to the input of an analog integrator 35, the output of which is connected to the control input of VCO 25. As is known, the shift caused in the phase of a VCO output signal is proportional to the voltage applied to its control input.

Figure 3:
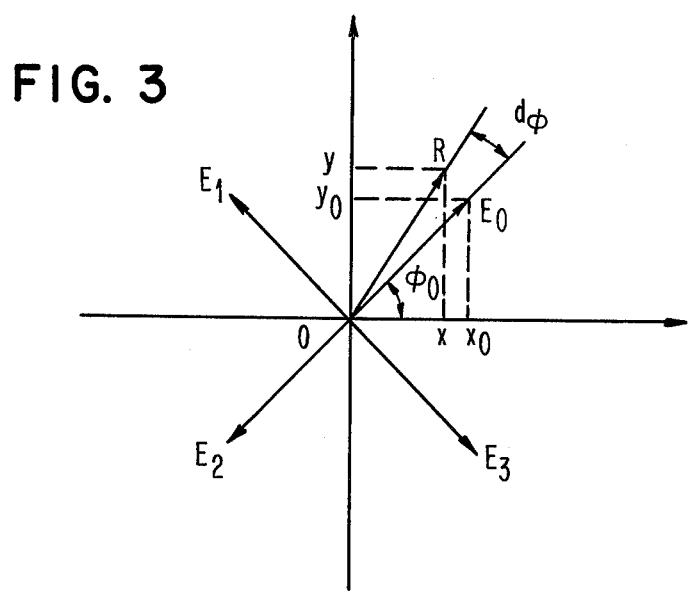
FIG. 3 is a signal space diagram illustrating a 4-phase PSK modulation scheme to facilitate an understanding of the invention.

Before describing the operation of the device of FIG. 2 incorporating the system of the present invention, the principles of operation thereof will be discussed with reference to FIG. 3. In the field of data transmission, the various states of the signal transmitted at each signaling instant are usually represented by means of a so-called signal space diagram. FIG. 3 illustrates a signal space diagram for a transmission system that uses a 4-phase PSK modulation scheme. Vectors $\vec{OE_0}$, $\vec{OE_1}$, $\vec{OE_2}$ and $\vec{OE_3}$ represent the four possible phases of the signal transmitted at each signaling instant. In the example shown, the phases of these four vectors are 45°, 135°, 225° and 315°, respectively. It will now be assumed that at a given signaling instant, the transmitted signal is the signal represented by vector $\vec{OE_0}$ of phase $\phi_o$, which may be defined by its coordinates $x_o$ and $y_o$. Coordinates $x_o$ and $y_o$ are the in-phase and quadrature components, respectively, of the transmitted signal. The noise effects introduced by the channel are such that vector $\vec{OR}$ representing the received signal will not coincide exactly with vector $\vec{OE_0}$ representing the transmitted signal. Vector $\vec{OR}$ is defined by its coordinates $x$ and $y$, that is to say, by the in-phase and quadrature components of the received signal. The phase of vector $\vec{OR}$ will be designated $\phi$, representing the phase of the received signal.

The quantity $d\phi$ defined by $$d\phi = \phi - \phi_o \tag{1}$$

represents the phase error which alters the phase of the received signal. The phase error $d\phi$ is an important parameter in phase-locked-loop carrier synchronization systems since this parameter is used to adjust the locally generated reference carrier. The object of the phase-locked loop is to minimize this phase error. The reference carrier is perfectly synchronized with the transmitted signal when the phase error is zero.

Phase $\phi$ of vector $\vec{OR}$ can be expressed as $$\phi = \tan^{-1}(Y/x) \tag{2}$$

Equating the phase error defined by expression (1) with the differential of $\phi$, we get, in accordance with expression (2)

$$d\phi = \frac{1}{1 + (\frac{y^2}{x})} d(\frac{y}{x}) \tag{3}$$

or $$d\phi = \frac{xdy - ydx}{x^2 + y^2} \tag{4}$$

In normal operation, it may be assumed that $$x^2 + y^2 = \text{constant} \tag{5}$$

For simplicity, it will further be assumed that
$$x^2 + y^2 = 1 \tag{6}$$

Expression (4) becomes $$d\phi = xdy - ydx \tag{7}$$

Quantities $dx$ and $dy$ can be expressed as $$dx = x - x_o$$
$$dy = y - y_o \tag{8}$$

Substituting (8) into (7), we get $$d\phi = x_oy - y_ox \tag{9}$$

The disadvantage of expression (9) is that, if it is to be used for carrier synchronization purposes, components $x_o$ and $y_o$ of the transmitted signal must be determined. In the prior art carrier synchronization systems designed to be used in coherent PSK demodulators, components $x_o$ and $y_o$ are obtained by calculating their estimated values. The determination of estimated values is either too slow or too difficult a process to carry out in satellite transmission systems wherein the data rate is very high. In a system having a data rate of, say, 50 megabits per second, the duration of the signaling period is only 40 nanoseconds. In the carrier synchronization system of the present invention that is operable in a 4-phase coherent PSK demodulator, it is preferred to use the following expression $$d\phi = y \operatorname{sign} x - x \operatorname{sign} y \tag{10}$$

In expression (10), the quantities "sign $x$" and "sign $y$" are used as estimated values of transmitted signal components $x_o$ and $y_o$. Expression (10) leads to a simplified implementation of the carrier synchronization system and yields very satisfactory results.

The operation of the device of FIG. 2, which uses the above expression (10), will now be described. The 4-phase input PSK signal is demodulated by the reference carrier that is generated by oscillator 25 and fed to demodulators 24I and 24Q as in-phase reference carrier and quadrature reference carrier, respectively, the phase of the quadrature carrier being shifted 90° relative to the in-phase carrier. The in-phase and quadrature components, respectively designated $x$ and $y$, of the PSK signal are obtained at the output of demodulators 24I and 24Q. Components $x$ and $y$ are respectively passed through filters 27I and 27Q and respectively inputted to limiters 28I and 28Q, the outputs of which continually supply the signs of $x$ and $y$, respectively. For simplicity, no account of time has been taken in expressions (1) through (10) above. It will be apparent to those skilled in the art that these expressions are, of course, only valid at the signaling instants which are the only instants at which information is carried by the 4-phase PSK signal. The sign $x$ and sign $y$ information available at the signaling instants is obtained in the device of FIG. 2 by sampling the outputs of limiters 28I and 28Q at the signaling instants, using samplers 29I and 29Q, respectively. The sign $x$ and sign $y$ information respectively supplied by samplers 29I and 29Q is fed to decoder 31 to be decoded in accordance with CCITT Recommendation V26.

The components $x$ and $y$ obtained at the output of filters 27I and 27Q are also respectively inputted to delay means 32I and 32Q, each of which introduces a T/2-second delay, T being the signaling period. The use of delay means 32I and 32Q will be described hereafter. The delayed component $x$ available at the output of delay means 32I is multiplied by the information (sign $y$) supplied by sampler 29Q through multiplier 33I. The delayed component $y$ obtained at the output of delay means 32Q is multiplied by the information (sign $x$) provided by sampler 29I through multiplier 33Q. The product ($x$ sign $y$) supplied by multiplier 33I is subtracted by summing device 34 from the product ($y$ sign $x$) provided by multiplier 33Q. At the output of summing device 34 there is obtained the phase error $d\phi$ as defined by expression (10), which is repeated below for convenience $$d\phi = y \, \text{sign} \, x - x \, \text{sign} \, y \qquad (10)$$

In order to prevent phase error changes from having a detrimental effect on system operation, the phase error $d\phi$ as defined by expression (10) is integrated by means of integrator 35. The output of integrator 35 provides a time integrated phase error $d\Phi$ defined by $$d\Phi = \overline{y \, \text{sign} \, x} - \overline{\text{sign} \, y} \qquad (11)$$

The reference carrier generated by oscillator 25 is adjusted as a function of the integrated phase error $d\Phi$ until $d\Phi = 0$. When $d\Phi = 0$, the reference carrier is synchronized with the transmitted signal. For clarity, the integrator 35 is illustrated as a separate device from the VCO 25, but is will be apparent to those skilled in the art that if the oscillator being used exhibits this integration effect, no separate integrator will be required.

The presence of delay means 32I and 32Q in the system of the present invention will be now explained with reference to FIGS. 4a-4f. As has been seen, expression (10) requires that the products ($x \, \text{sign} \, y$) and ($y \, \text{sign} \, x$) be calculated. Such products can readily be obtained when quantities $x$ and $y$ are binary coded, but in the example shown in FIG. 2 components $x$ and $y$ are represented by analog signals. For maximum system effectiveness, it is necessary that the signals representative of the products ($x \, \text{sign} \, y$) and ($y \, \text{sign} \, x$), as obtained at the output of analog multipliers 33I and 33Q, be maximum energy signals. It is for this reason that delay means 32I and 32Q are used, as will become apparent. FIGS. 4a and 4b show waveforms representing components $x$ and $y$ as obtained at the output of filters 27I and 27Q, respectively, in the case of a single phase value isolated at time $t_o$. Such waveforms are generally called signal elements and a detailed description thereof will be found, for example, in the aforementioned book by R. W. Lucky et al, chapter 4, section 4.1.1. In the figures, it has been assumed that components $x$ and $y$ are equal to unity. The sign of $y$ at time $t_o$ has also been shown in FIG. 4b. This sign takes the form, at the output of sampler 29Q, of a positive pulse of amplitude equal to unity, beginning at time $t_o$ and ending at time $t_1$. If we calculate the product of the waveform representative of component $x$ between $t_o$ and $t_1$ (FIG. 4a) by the pulse representative of the sign of $y$ (FIG. 4b), we obtain the waveform shown in FIG. 4c. Although the waveform in FIG. 4c represents the product ($x \, \text{sign} \, y$), it is not a maximum energy waveform. In FIG. 4c, the energy is represented by the shaded area. The addition of delay means will make it possible to increase this energy, as explained below. The waveform in FIG. 4d represents component $x$ delayed T/2 sec., i.e., the signal obtained at the output of delay means 32I. For clarity, the component $y$ and the pulse representative of the sign of $y$ at time $t_o$ are shown again in FIG. 4e. If we make the product of the waveform representative of component $x$ delayed T/2 sec. between $t_o$ and $t_1$ (FIG. 4d) by the pulse representative of the sign of $y$ (FIG. 4e), we obtain the waveform shown in FIG. 4f which represents the product ($x \, \text{sign} \, y$) but is, this time, a maximum energy waveform.

While the invention has been particularly shown and described with reference to a preferred embodiment thereof, it will be understood by those skilled in the art that numerous changes in form and detail may be made therein without departing from the spirit and scope of the invention.

What is claimed is:

1. In a 4-phase coherent PSK demodulator of the type that includes a phase adjustable reference carrier source, means for demodulating a received signal with said reference carrier source to provide first and second signals respectively representing the in-phase and quadrature components of said received signal, a phase synchronization system for said reference carrier characterized in that it comprises:

means responsive to said first and second signals to detect the signs thereof and produce in-phase and quadrature sign signals, multiplier means coupled to receive said first signal and said quadrature sign signal to produce a first product signal and to receive said second signal and said in-phase sign signal to produce a second product signal, and means coupled to said multiplier means and responsive to said first and second product signals to produce an error signal, said error signal being supplied to said adjustable reference carrier source to control the phase thereof.

2. In a 4-phase coherent PSK demodulator of the type that includes a phase adjustable reference carrier source, means for demodulating a received signal with said reference carrier source to provide first and second signals respectively representing the in-phase and quadrature components of said received signal, a phase synchronization system for said reference carrier characterized in that it comprises:

means responsive to said first and second signals to detect the signs thereof and produce in-phase and quadrature sign signals, delay means for delaying said first and second signals by approximately T/2 seconds to respectively produce delayed first and second signals, T being the signaling period, multiplier means coupled to receive said delayed first signal and said quadrature sign signal to produce a first product signal and to receive said delayed second signal and said in-phase sign signal to produce a second product signal, and means coupled to said multiplier means and responsive to said first and second product signals to produce an error signal, said error signal being supplied to said adjustable reference carrier source to control the phase thereof.

* * * * *